(12) United States Patent
Lim et al.

(10) Patent No.: US 12,547,725 B2
(45) Date of Patent: Feb. 10, 2026

(54) METHOD FOR CONTROLLING SECURE BOOT OF VEHICLE CONTROLLER AND SYSTEM THEREOF

(71) Applicants: HYUNDAI MOTOR COMPANY, Seoul (KR); Kia Corporation, Seoul (KR); HYUNDAI AUTOEVER Corp., Seoul (KR)

(72) Inventors: Hong Yeol Lim, Incheon (KR); Bong Ju Kim, Yongin-si (KR)

(73) Assignees: HYUNDAI MOTOR COMPANY, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 287 days.

(21) Appl. No.: 18/121,657

(22) Filed: Mar. 15, 2023

(65) Prior Publication Data
US 2024/0126887 A1  Apr. 18, 2024

(30) Foreign Application Priority Data
Oct. 18, 2022 (KR) .................. 10-2022-0134227

(51) Int. Cl.
*G06F 21/57* (2013.01)
*G06F 11/10* (2006.01)
*G06F 21/60* (2013.01)

(52) U.S. Cl.
CPC .......... *G06F 21/575* (2013.01); *G06F 11/102* (2013.01); *G06F 21/602* (2013.01)

(58) Field of Classification Search
None
See application file for complete search history.

(56) References Cited

U.S. PATENT DOCUMENTS

2022/0035926 A1\* 2/2022 Tsai ..................... G06F 21/74

FOREIGN PATENT DOCUMENTS

WO  WO-2021087221 A1 \* 5/2021 ........... G06F 21/572

\* cited by examiner

*Primary Examiner* — Syed A Roni
(74) *Attorney, Agent, or Firm* — MORGAN, LEWIS & BOCKIUS LLP

(57) ABSTRACT

In a method and a system for controlling a secure boot of a vehicle controller, when a first vehicle controller performs a normal boot as an error occurs in a parity bit of a firmware image, in the process of performing the secure boot by vehicle controllers related to autonomous driving, the first vehicle controller recovers firmware by internetworking with a second vehicle controller that is successful in the secure boot to perform the secure boot thereafter. The method includes performing, by a first vehicle controller, a normal boot, when the error occurs in the parity bit of the firmware image related to the secure boot, and recovering, by the first vehicle controller, the firmware image by internetworking with the second vehicle controller that is successful in the secure boot.

17 Claims, 4 Drawing Sheets

METHOD FOR CONTROLLING SECURE BOOT OF VEHICLE CONTROLLER AND SYSTEM THEREOF

CROSS-REFERENCE TO RELATED APPLICATION

This application claims the benefit of priority to Korean Patent Application No. 10-2022-0134227, filed in the Korean Intellectual Property Office on Oct. 18, 2022, the entire contents of which are incorporated herein by reference.

TECHNICAL FIELD

The present disclosure relates to a technology of controlling a secure boot of vehicle controllers relates to autonomous driving, and more particularly to a method for controlling a secure boot of a vehicle controller and a system for the same, which enables a first vehicle controller to recover firmware by internetworking a second vehicle controller that is successful in secure boot, as an error occurs in a parity bit of firmware (a firmware image or a firmware file) provided in the first vehicle controller.

BACKGROUND

In general, a vehicle security technology is classified into a firmware integrity protection technology, an access protection technology, a data protection technology, and a network protection technology. In this case, a technology, such as 'Secure Flash' and 'Secure Boot', is applied to the firmware integrity protection technology, a technology, such as 'Seed Key' is applied to the access protection technology, a technology, such as Full Disk Encryption (FED) or File Based Encryption (FBE), is applied to the user data protection technology, and a technology, such as 'Firewall' or 'Intrusion', is applied to the network protection technology.

The technology of 'Secure Boot' is to inspect the validation of firmware in a booting process based on Unified Extensible Firmware Interface (UEFI). In other words, 'Secure Boot' refers to booting based on firmware (reliable firmware) having a signature. In this case, the UEFI is a protocol for defining a software interface between an operating system and a platform firmware. In contrast to 'Secure Boot', 'Normal Boot' refers to booting without considering the signature of the firmware, that is, firmware-based booting having no signature.

Vehicle controllers relates to autonomous driving include a secure storage to store a certificate, a public key, and a private key, and a flash memory to store firmware, such that 'Secure Boot' is performed.

The flash memory may have a plurality of firmware images stored therein, and an error may occur in a parity bit of a specific firmware image of the plurality of firmware images due to a memory fault or hacking. When the error occurs in the parity bit of the specific firmware image, the inspection of the signature for the specific firmware image may be failed. Accordingly, 'Secure Boot' may not be performed.

Accordingly, when the inspection of the signature for the specific firmware image is failed, a scheme for recovering the specific firmware image is required.

The matter described in "Background" is made for the convenience of explanation, and may include matters other than a related art well known to those skilled in the art.

SUMMARY

The present disclosure has been made to solve the above-mentioned problems occurring in the prior art while advantages achieved by the prior art are maintained intact.

An aspect of the present disclosure provides a method for controlling a secure boot of a vehicle controller, in which, when a first vehicle controller performs a normal boot as an error occurs in a parity bit of a firmware image, in the process of performing the secure boot by vehicle controllers related to autonomous driving, the first vehicle controller recovers firmware by internetworking with a second vehicle controller that is successful in the secure boot to perform the secure boot thereafter, and a system for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for controlling a secure boot may include performing, by a first vehicle controller, a normal boot, when an error occurs in a parity bit of a firmware image related to the secure boot, and recovering, by the first vehicle controller, the firmware image by internetworking with a second vehicle controller that is successful in the secure boot.

According to an embodiment of the present disclosure, the recovering of the firmware image includes storing a new firmware image, which is received from the second vehicle controller, in a region other than a region having an existing firmware image in a flash memory.

According to an embodiment of the present disclosure, the recovering of the firmware image includes determining a first hash value of an existing certificate, determining a second hash value of a new certificate received from the second vehicle controller, maintaining the existing certificate, when the first hash value and the second hash value are equal to each other, and storing the new certificate in a flash memory of a hardware security module (HSM) or a trusted execution environment memory, when the first hash value is not equal to the second hash value.

According to an embodiment of the present disclosure, the recovering of the firmware image includes maintaining an existing private key, when a new private key received from the second vehicle controller is equal to an existing private key stored in a security key storage of the HSM, requesting for another new private key from the second vehicle controller, when the new private key received from the second vehicle controller is different from the existing private key, and determining the HSM as being failed, when the number of times of requesting for a new private key exceeds a preset number of times.

According to an embodiment of the present disclosure, the recovering of the firmware image includes transmitting, by the second vehicle controller, information on a firmware image having the error in the parity bit and the information on a vehicle type, to a data server, receiving, by the second vehicle controller, a new firmware image, the new certificate, and the new private key from the data server; and transmitting, to the first vehicle controller, a new firmware image, a new certificate, and a new private key, which are received from the data server.

According to an embodiment of the present disclosure, the performing of the normal boot by the first vehicle controller further includes receiving a verification from the second vehicle controller with respect to whether the error occurs in the parity bit of the firmware image related to the secure boot.

According to an embodiment of the present disclosure, the receiving of the verification from the second vehicle controller may further include transmitting, by the first vehicle controller, a hash value of the firmware image having the error in the parity bit of the firmware image to the second vehicle controller, and verifying, by the second vehicle controller, the hash value received from the first vehicle controller, based on a table having a hash value for each firmware image provided in the first vehicle controller, as the second vehicle controller has the table.

According to an embodiment of the present disclosure, a system for controlling a secure boot may include a first vehicle controller to perform a normal boot when an error occurs in a parity bit of a firmware image related to the secure boot and to recover the firmware image by internetworking with a second vehicle controller that is successful in the secure boot, and a second vehicle controller to transmit a new firmware image, a new certificate, and a new private key necessary to recover the firmware image to the first vehicle controller.

According to an embodiment of the present disclosure, the first vehicle controller may include a secure storage to store a certificate, a flash memory to store at least one firmware image, and a hardware security module (HSM) secure key storage to store a private key.

According to an embodiment, the first vehicle controller may store a new firmware image, which is received from the second vehicle controller, in a region other than a region having the firmware image having the error in the parity bit, inside the flash memory.

According to an embodiment of the present disclosure, the first vehicle controller determines a first hash value of a certificate stored in a secure storage, determines a second hash value of a new certificate received from the second vehicle controller, and maintain the certificate stored in the secure storage, when the first hash value is equal to the second hash value.

According to an embodiment of the present disclosure, the first vehicle controller may store the new certificate in the HSM flash memory, when the first hash value is not equal to the second hash value.

According to an embodiment of the present disclosure, the first vehicle controller may store the new certificate in a trusted execution environment (TEE) memory, when the first hash value is not equal to the second hash value.

According to an embodiment of the present disclosure, the first vehicle controller may maintain a private key stored in the security key storage, when the private key stored in the HSM security key storage is equal to a new private key received from the second vehicle controller.

According to an embodiment of the present disclosure, the first vehicle controller may request for another new private key from the second vehicle controller when the private key stored in the HSM security key storage is different from a new private key received from the second vehicle controller, and may determine the HSM as being faulted, when the number of times of requesting for a new private key exceeds a preset number of times.

According to an embodiment of the present disclosure, the first vehicle controller may transmit, to the second vehicle controller, a hash value of a firmware image having the error in the parity bit thereof, and may receive a verification from the second vehicle controller with respect to whether the error occurs in the parity bit of the firmware image.

According to an embodiment of the present disclosure, the second vehicle controller may include a table having a hash value for each firmware image provided in the first vehicle controller, and may verify the hash value received from the first vehicle controller, based on the table.

According to an embodiment of the present disclosure, the second vehicle controller may transmit, to a data server, information on the firmware image having the error in the parity bit thereof and information on a vehicle type, and may receive a new firmware image, a new certificate, and a new private key from the data server.

According to an embodiment of the present disclosure, the second vehicle controller may use a session key based on transport layer security (TLS) in communication with the data server.

According to an embodiment of the present disclosure, the first vehicle controller may perform a secure access, which is based on 'Seed Key', to the second vehicle controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
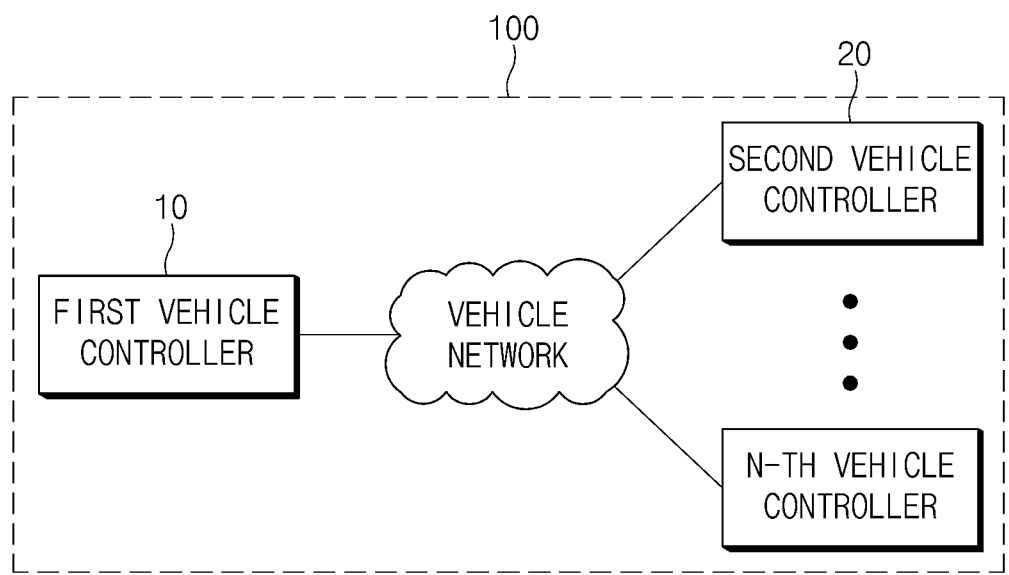
FIG. 1 illustrates a schematic diagram of an internal network structure of an autonomous driving vehicle according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a schematic diagram of an internal network structure of an autonomous driving vehicle according to an embodiment of the present disclosure, and illustrating a connection structure between vehicle controllers 10 and 20. In this case, the internal network of the autonomous driving vehicle may include Controller Area Network (CAN), Controller Area Network with Flexible Data-rate (CAN FD), Local Interconnect Network (LIN), FlexRay, Media Oriented Systems Transport (MOST), or Ethernet.

As illustrated in FIG. 1, according to an embodiment of the present disclosure, the internal network of the autonomous driving vehicle 100 may include a first vehicle controller 10 and a second vehicle controller 20 serving as vehicle controllers involved in autonomous driving. In this case, the number of vehicle controllers involved in the autonomous driving is provided only for the illustrative purpose, and the present disclosure is not limited thereto.

The vehicle controllers 10 and 20, which are controllers to perform a specific function for the autonomous driving of the vehicle, may include a micro control unit (MCU), an electronic control unit (ECU), an engine control unit (ECU), a motor control unit (MCU), or a transmission control unit (TCU). Each of these units according to an exemplary embodiment of the present disclosure may be implemented by a non-transitory memory storing, e.g., a program(s), software instructions reproducing algorithms, etc., which, when executed, performs various functions described hereinafter, and a processor (e.g., computer, microprocessor, CPU, ASIC, circuitry, logic circuits, etc.) configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

An encryption process may be involved in the process of making communication between the first vehicle controller 10 and the second vehicle controller 20, to maintain integrity and confidentiality. For example, a Transport Layer Security (TLS)-based session key may be applied between the first vehicle controller 10 and the second vehicle controller 20. In this case, the session key may be generated through a key agreement process between the first vehicle controller 10 and the second vehicle controller 20. In this case, the key agreement process may be performed based on Elliptic Curve Diffie Hellman Ephermeral (ECDHE).

Figure 2:
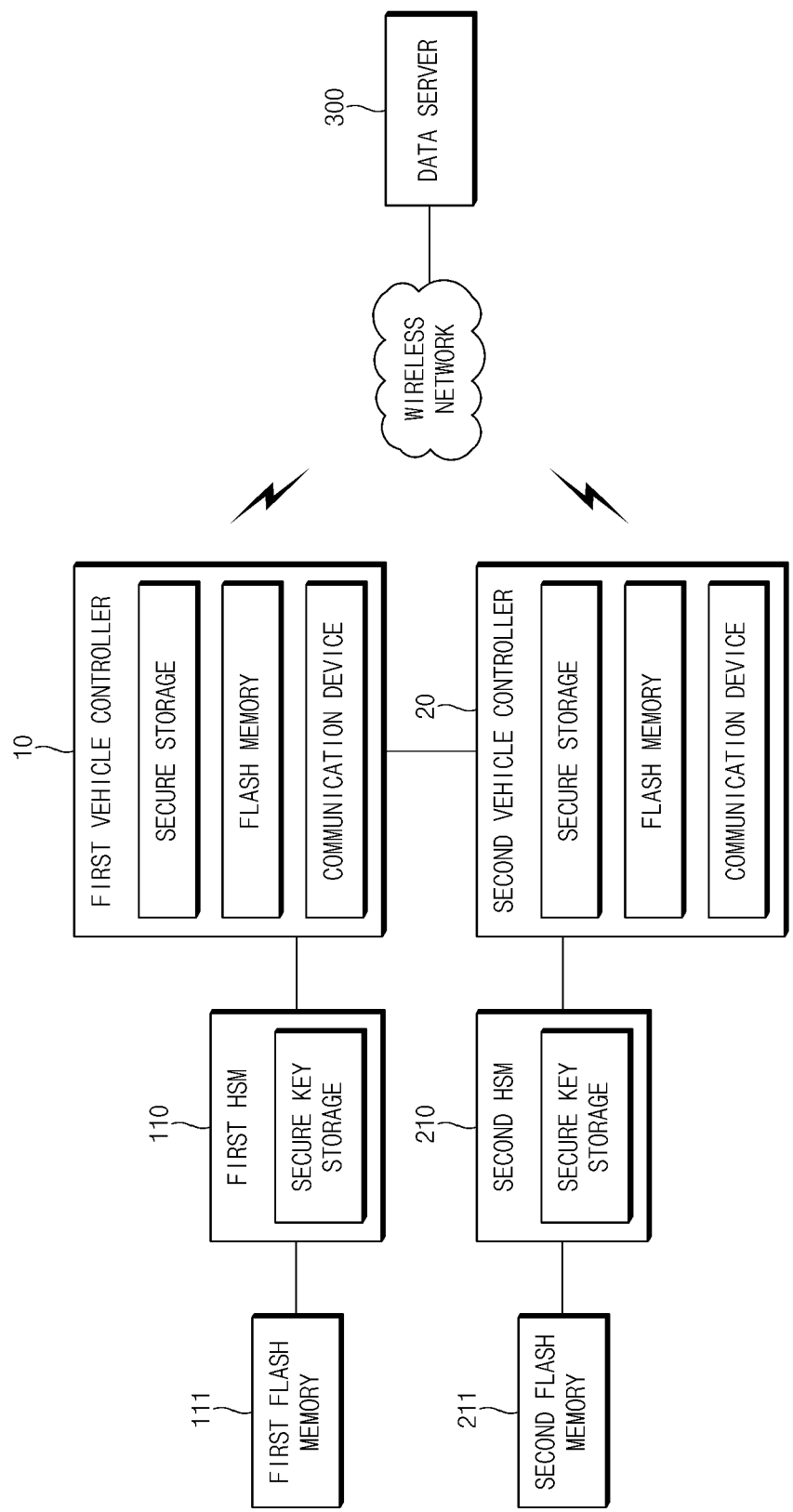
FIG. 2 illustrates a schematic diagram of a configuration of a system for controlling a secure boot of a vehicle controller according to an embodiment of the present disclosure.

FIG. 2 illustrates a schematic diagram of a configuration of a system for controlling a secure boot of a vehicle controller, according to an embodiment of the present disclosure.

As illustrated in FIG. 2, according to an embodiment of the present disclosure, the system for controlling the secure boot of the vehicle controller may include a first vehicle controller 10, a first hardware security module (HSM) 110, a first flash memory 111, a second vehicle controller 20, a second HSM 210, a second flash memory 211, and a data server 300. In this case, according to an embodiment of the present disclosure, the components may be combined into each other to be implemented in one form, or some components may be omitted, depending on the manners of reproducing the system for controlling the secure boot of the vehicle controller.

In this case, components of the first vehicle controller 10 may be the same as components of the second vehicle controller 20, and each of the first vehicle controller 10 and the second vehicle controller 20 may include a secure storage, a flash memory, and a communication device. In this case, the secure storage, which serves as a root of trust (RoT) may store a certificate and a public key, and the flash memory may store a firmware image.

The communication device, which is a module to provide a communication interface with the data server 300, may include at least one of a mobile communication module, a wireless Internet module, or a short-range wireless communication module.

The mobile communication module may make communication with the data server 300 over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The wireless Internet module, which is a module for wireless Internet access, may make communication with the data server 300 through Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication with the data server 300 through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

In addition, the first HSM 110 and the second HSM 210 may each have a secure key storage to store a private key. In addition, the first HSM 110 may further include a first flash memory 111, and the second HSM 210 may further include a second flash memory 211.

The first vehicle controller 10 may perform a normal boot instead of performing a secure boot, when an error occurs in a parity bit of a firmware image related to the secure boot. As described above, when performing the normal boot, the first vehicle controller 10 may recover the firmware by internetworking with the second vehicle controller 20 that is successful in the secure boot. In this case, the first vehicle controller 10 may perform the normal boot even though an error occurs in a parity bit for a hash value of the certificate, and may recover the firmware by internetworking with the second vehicle controller 20 that is successful in the secure boot. For reference, when the normal boot is failed, self-recovery is difficult. Accordingly, an operator may recover the firmware. In addition, the second vehicle controller 20 that is successful in the secure boot may notify another vehicle controller of that the second vehicle controller 20 is successful in the secure boot.

The first vehicle controller 10 may transmit a hash value (digest value) of a firmware image having the error in the parity bit thereof, to the second vehicle controller 20, thereby receiving the verification from the second vehicle controller 20 with respect to whether the error occurs in the parity bit of the firmware image. In this case, the second vehicle controller 20 may include a table having a hash value for each firmware image provided in the first vehicle controller 10, and may verify the hash value received from the first vehicle controller 10, based on the table.

When performing the normal boot, the first vehicle controller 10 notifies a driver of that the error occurs in the parity bit of the firmware image, and may request for a command for whether to recover the firmware.

The first vehicle controller 10 may request for a new firmware image, which corresponds to the firmware image having the error in the parity bit thereof, from the second vehicle controller 20 that is successful in the secure boot, when the driver permits the recovery of the firmware, and may receive the new firmware image, a new certificate, and a new private key (a new secrete key), from the second vehicle controller 20. In this case, the new firmware image refers to a firmware image having no error in the parity bit thereof.

The first vehicle controller 10 may store the new firmware image, which is received from the second vehicle controller 20, in a region other than a storage region of the firmware image having the error in the parity bit thereof, inside the flash memory, when storing the new firmware image received from the second vehicle controller 20 in the flash memory. This is to avoid a region of a memory fault.

The first vehicle controller 10 may determine the first hash value of an existing certificate stored in the secure storage, and may determine a second hash value of the new certificate received from the second vehicle controller 20.

The first vehicle controller 10 may maintain the existing certificate stored in the secure storage, when the first hash value and the second hash value are equal to each other. In this case, an existing public key included in the existing certificate is maintained.

When the first hash value and the second hash value are not equal to each other, the first vehicle controller 10 may determine that the secure storage is failed (memory fault). Accordingly, the new certificate may be stored in the first flash memory 111 provided in the first HSM 110. In this case, the new certificate includes a new public key. In this case, when the first vehicle controller 10 has Trusted Execution Environment (TEE) instead of the first HSM 110, the new certificate may be stored in the last region of the memory provided in the TEE.

The first vehicle controller 10 may maintain the existing private key, when the new private key is the same as the existing private key stored in the secure key storage provided in the first HSM 110. In this case, when the existing private key is different from the new private key, the first vehicle controller 10 may stop the procedure (including the procedure of recovering the certificate, the public key, or the private key) of recovering the firmware image and may re-perform the procedure of requesting for the new firmware image, the new certificate, and the new private key from the second vehicle controller 20 that is successful in the secure boot. When the existing private key is different from the new private key even though the number of times of the requesting exceeds the preset number of times (for example, three times), the first vehicle controller 10 may determine the first HSM 110 as being failed.

The first vehicle controller 10 may notify the driver of that the procedure of recovering the firmware image is completed, and may request for a re-booting, when the procedure of recovering the firmware image is completed.

In addition, when the private key stored in the security key storage of the first HSM 110 is stolen by a hacking attack, that is, when the firmware image is falsified by the hacking attack, the first vehicle controller 10 may recover all firmware images stored in the first vehicle controller 10 by internetworking the second vehicle controller 20 that is successful in the secure boot. In this case, the first vehicle controller 10 may periodically transmit a signature value for each firmware image to the second vehicle controller 20 and may receive a determination on whether the firmware image is forged, from the second vehicle controller 20. In this case, the second vehicle controller 20 has a table in which a signature value is recorded with respect to each firmware image of the first vehicle controller 10. Accordingly, the second vehicle controller 20 may determine whether the firmware image is forged, by comparing a signature value for each firmware image received from the first vehicle controller 10 with a signature value for each firmware image recorded in the table.

Meanwhile, when receiving the request for the new firmware image corresponding to the firmware image having the error in the parity bit thereof, from the first vehicle controller 10, the second vehicle controller 20 may transmit the information on the firmware image having the error in the parity bit thereof and information on a vehicle type, to the data server 300 while requesting for the new firmware image, the new certificate, and the new private key. In this case, the data server 300 may transmit the new firmware image, the new certificate, and the new private key to the second vehicle controller 20.

An encryption process may be involved in the process of making communication between the second vehicle controller 20 and the data 300, to maintain integrity and confidentiality. For example, a Transport Layer Security (TLS)-based session key may be applied between the second vehicle controller 20 and the data server 300.

In this case, the second vehicle controller 20 may transmit the new firmware image, the new certificate, and the new private key, which are received from the data server 300, to the first vehicle controller 20.

According to another embodiment, when the first vehicle controller 10 and the second vehicle controller 20 include secure storages having a significantly large volume, the first vehicle controller 10 may store all firmware images and all certificates (including a public key), which are provided in the second vehicle controller 20, in the secure storage thereof, and the second vehicle controller 20 may store, in the secure storage thereof, all firmware images and all certificates (including a public key) provided in the first vehicle controller 10. Accordingly, the first vehicle controller 10 and the second vehicle controller 20 may not need a flesh memory and a communication device. In this case, when the first vehicle controller 10 requests for the new firmware image, the new certificate, and the new private key from the second vehicle controller 20, or when the second vehicle controller 20 requests for the new firmware image, the new certificate, and the new private key from the first vehicle controller 10, a secure access, which is based on 'Seed Key' is made between the first vehicle controller 10 and the second vehicle controller 20 to maintain integrity and confidentiality.

Figure 3:
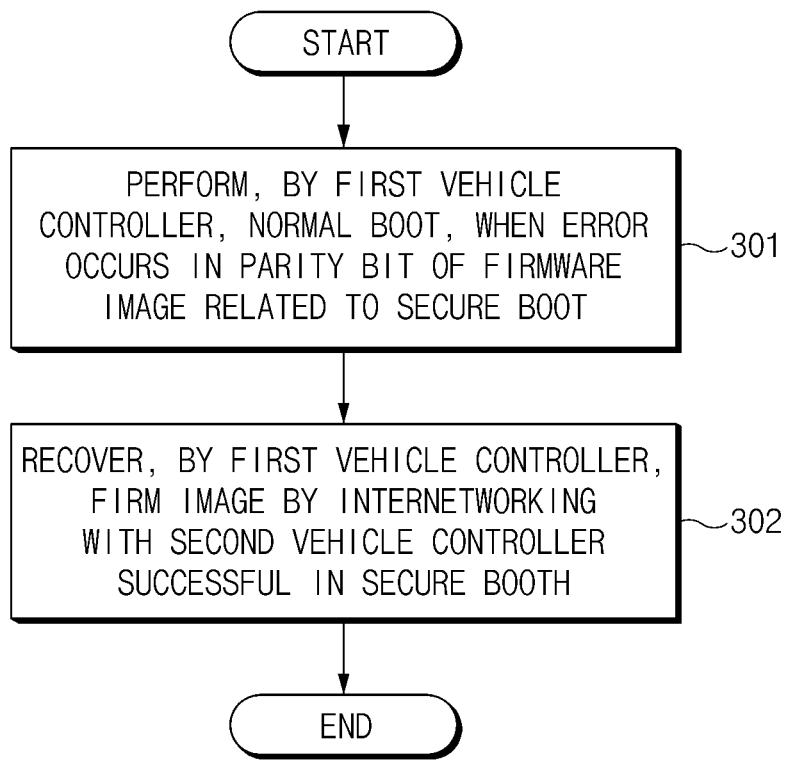
FIG. 3 illustrates a flowchart of a method for controlling a secure boot of a vehicle controller according to an embodiment of the present disclosure.

FIG. 3 illustrates a flowchart of a method for controlling a secure boot of a vehicle controller according to an embodiment of the present disclosure.

First, when an error occurs in a parity bit of a firmware image related to a secure boot, the first vehicle controller 10 performs a normal boot (301).

Thereafter, the first vehicle controller 10 recovers the firmware image by internetworking with the second vehicle controller 20 that is successful in the secure boot (302). In this case, the second vehicle controller 20 may transmit the new firmware image, the new certificate, and the new private key to the first vehicle controller 10.

Figure 4:
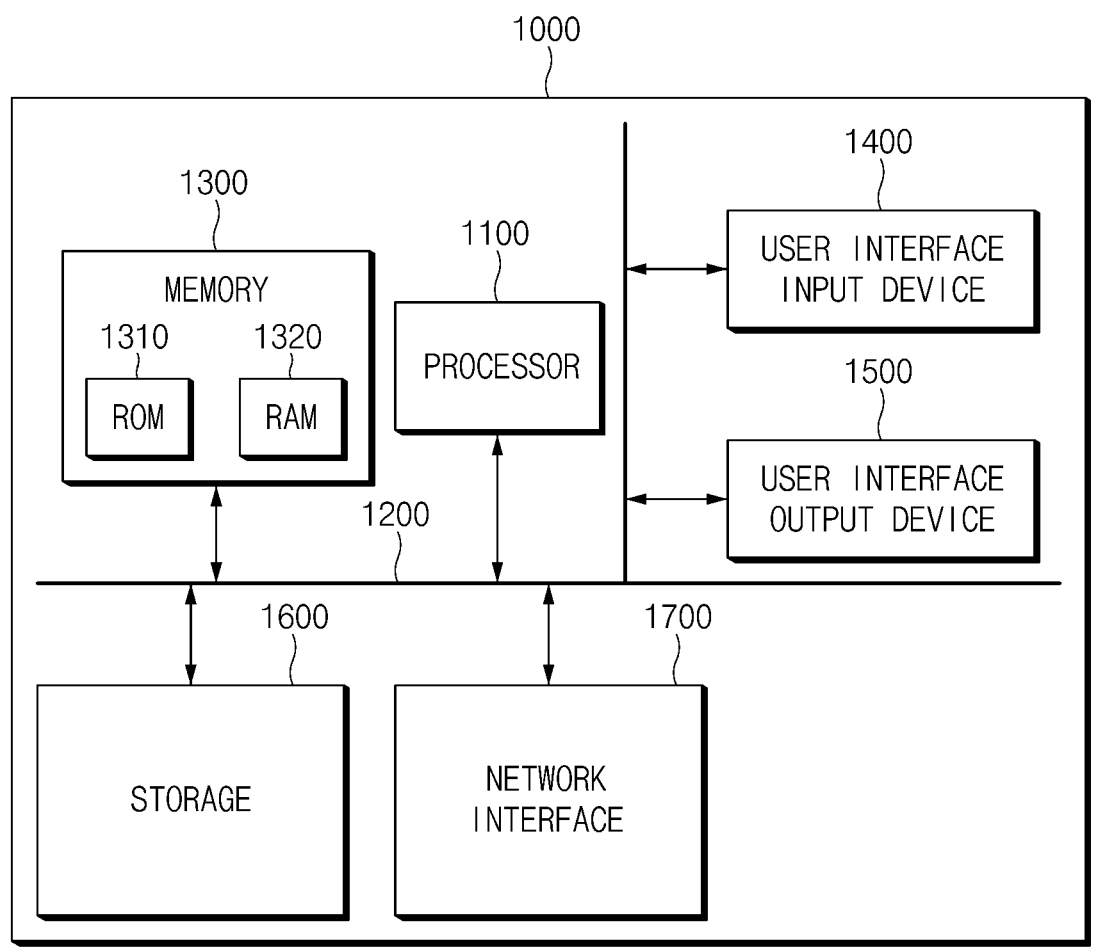
FIG. 4 illustrates a block diagram showing a computing system to execute a method for controlling a secure boot of a vehicle controller according to an embodiment of the present disclosure.

FIG. 4 illustrates a block diagram showing a computing system to execute a method for controlling a secure boot of a vehicle controller according to an embodiment of the present disclosure.

Referring to FIG. 4, the method for controlling the secure boot of the vehicle controller may be implemented through a computing system according to an embodiment of the present disclosure. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the method for controlling the secure boot of the vehicle controller and the system for the same, when the first vehicle controller performs the normal boot, as an error occurs in a parity bit of a firmware image, in the process of performing the secure boot by vehicle controllers related to autonomous driving, the first vehicle controller recovers firmware by internetworking with a second vehicle controller that is successful in the secure boot to perform the secure boot thereafter.

The above description is merely an example of the technical idea of the present disclosure, and various modifications and modifications may be made by one skilled in the art without departing from the essential characteristic of the invention.

Accordingly, embodiments of the present disclosure are intended not to limit but to explain the technical idea of the present disclosure, and the scope and spirit of the invention is not limited by the above embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a secure boot, the method comprising:
    occurring an error in a parity bit of a firmware image related to the secure boot;
    performing, by a first vehicle controller, a normal boot, in response to the occurrence of the error in the parity bit of the firmware image related to the secure boot;
    recovering, by the first vehicle controller, the firmware image by internetworking with a second vehicle controller that is successful in the secure boot,
    wherein the recovering the firmware image includes:
    determining, by the first vehicle controller, a first hash value of an existing certificate;
    determining, by the first vehicle controller, a second hash value of a new certificate received from the second vehicle controller; and
    maintaining, by the first vehicle controller, the existing certificate when the first hash value and the second hash value are equal to each; and storing, by the first vehicle controller, the new certificate in a flash memory of a hardware security module (HSM) or a trusted execution environment memory when the first hash value is not equal to the second hash value.

2. The method of claim 1, wherein the recovering the firmware image includes:
    storing, by the first vehicle controller, a new firmware image, which is received from the second vehicle controller, in a region other than a region having an existing firmware image in a flash memory.

3. The method of claim 1, wherein the recovering the firmware image includes:
    maintaining, by the first vehicle controller, an existing private key when a new private key received from the second vehicle controller is equal to the existing private key stored in a security key storage of a hardware security module (HSM);
    requesting, by the first vehicle controller, for another new private key from the second vehicle controller when the new private key received from the second vehicle controller is different from the existing private key; and
    determining the HSM as being failed when a number of times of requesting for a new private key exceeds a preset number of times.

4. The method of claim 1, wherein the recovering the firmware image includes:
    transmitting, by the second vehicle controller, information on the firmware image having the error in the parity bit and information on a vehicle type, to a data server;
    receiving, by the second vehicle controller, a new firmware image, a new certificate, and a new private key from the data server; and
    transmitting, to the first vehicle controller, the new firmware image, the new certificate, and the new private key, which are received from the data server.

5. The method of claim 1, wherein the performing a normal boot by the first vehicle controller further includes:

receiving a verification from the second vehicle controller with respect to whether the error occurs in the parity bit of the firmware image related to the secure boot.

6. The method of claim 5, wherein the receiving a verification from the second vehicle controller includes:

transmitting, by the first vehicle controller, a hash value of the firmware image having the error in the parity bit of the firmware image to the second vehicle controller; and verifying, by the second vehicle controller, the hash value received from the first vehicle controller, based on a table having a hash value for each firmware image provided in the first vehicle controller, as the second vehicle controller has the table.

7. A system for controlling a secure boot, the system comprising:

a first vehicle controller configured to perform a normal boot in response to occurrence of an error in a parity bit of a firmware image related to the secure boot and to recover the firmware image by internetworking with other vehicle controllers that are successful in the secure boot; and a second vehicle controller configured to transmit a new firmware image, a new certificate, and a new private key necessary to recover the firmware image, to the first vehicle controller, wherein the first vehicle controller includes:

a secure storage to store a certificate;

a flash memory to store at least one firmware image; and a security key storage included in a hardware security module (HSM) to store a private key, and wherein the first vehicle controller is further configured to:

determine a first hash value of the certificate stored in the secure storage, determine a second hash value of the new certificate received from the second vehicle controller, and maintain the certificate stored in the secure storage when the first hash value is equal to the second hash value.

8. The system of claim 7, wherein the first vehicle controller is further configured to store the new firmware image, which is received from the second vehicle controller, in a region other than a region having the firmware image having the error in the parity bit, inside the flash memory.

9. The system of claim 7, wherein the first vehicle controller is further configured to store the new certificate in a flash memory of the HSM when the first hash value is not equal to the second hash value.

10. The system of claim 7, wherein the first vehicle controller is further configured to store the new certificate in a trusted execution environment (TEE) memory when the first hash value is not equal to the second hash value.

11. The system of claim 7, wherein the first vehicle controller is further configured to maintain the private key stored in the security key storage when the private key stored in the security key storage of the HSM is equal to a new private key received from the second vehicle controller.

12. The system of claim 7, wherein the first vehicle controller is further configured to:

request for another new private key from the second vehicle controller when the private key stored in the security key storage of the HSM is different from the new private key received from the second vehicle controller, and determine the HSM as being failed when a number of times of requesting for a new private key exceeds a preset number of times.

13. The system of claim 7, wherein the first vehicle controller is further configured to:

transmit, to the second vehicle controller, a hash value of the firmware image having the error in the parity bit thereof, and receive a verification from the second vehicle controller with respect to whether the error occurs in the parity bit of the firmware image.

14. The system of claim 13, wherein the second vehicle controller is further configured to:

include a table having a hash value for each firmware image provided in the first vehicle controller, and verify the hash value received from the first vehicle controller, based on the table.

15. The system of claim 7, wherein the second vehicle controller is further configured to:

transmit, to a data server, information on the firmware image having the error in the parity bit of the firmware image and information on a vehicle type, and receive a new firmware image, a new certificate, and a new private key from the data server.

16. The system of claim 15, wherein the second vehicle controller is further configured to use a session key based on transport layer security (TLS) in communication with the data server.

17. The system of claim 7, wherein the first vehicle controller is further configured to perform a secure access, which is based on 'Seed Key', to the second vehicle controller.

* * * * *